United States Patent
Vowles

(10) Patent No.: US 9,958,566 B2
(45) Date of Patent: May 1, 2018

(54) AIRBORNE GEOPHYSICAL SURVEY SYSTEM

(71) Applicant: Isaac Max Porterfield, Vancouver (CA)

(72) Inventor: Alan Vowles, Devon (CA)

(73) Assignee: Isaac Max Porterfield, Vancouver (CA)

( * ) Notice: Subject to any disclaimer, the term of this patent is extended or adjusted under 35 U.S.C. 154(b) by 398 days.

(21) Appl. No.: 14/933,740

(22) Filed: Nov. 5, 2015

(65) Prior Publication Data

US 2016/0131790 A1 May 12, 2016

Related U.S. Application Data

(60) Provisional application No. 62/075,674, filed on Nov. 5, 2014.

(51) Int. Cl.
*B64C 39/02* (2006.01)
*G01V 3/165* (2006.01)

(52) U.S. Cl.
CPC .................... *G01V 3/165* (2013.01)

(58) Field of Classification Search
CPC .............. B64C 39/024; H04B 7/18513; H04B 7/18506; G07B 15/063
See application file for complete search history.

(56) References Cited

U.S. PATENT DOCUMENTS

| | | | |
|---|---|---|---|
| 6,876,202 B2 | 4/2005 | Morrison et al. | |
| 7,157,914 B2 | 1/2007 | Morrison et al. | |
| 2009/0284258 A1 | 11/2009 | Morrison et al. | |
| 2013/0173088 A1* | 7/2013 | Callou | B64C 39/024 701/2 |
| 2015/0153473 A1* | 6/2015 | Smith | G01V 3/12 702/11 |

* cited by examiner

*Primary Examiner* — Alesa Allgood
(74) *Attorney, Agent, or Firm* — Ryan W. Dupuis; Ade and Company Inc; Kyle R. Satterthwaiter

(57) ABSTRACT

An airborne ElectroMagnetic (EM) survey system wherein the system includes; first, a series of transmitter coils, which induce a primary (EM) field into the earth resulting in a secondary EM field being created in any sub-surface electrically conductive bodies; and second, a set of three orthogonal receiver coils which detect the secondary EM field. Multiple transmitter coils through which an electric current is pumped, form part of the structural, aluminum framework of a multi-rotor drone. The receiver sensor may be an EM induction sensor, comprised of multi-turn, copper windings, mounted inside an aerodynamic bird and separated by non-conductive sphalerite, which acts as an electrical insulator to limit self-induction and capacitance. Additionally a lighter-than-air balloon may be used to add vertical lift and increase a pendulum effect.

15 Claims, 7 Drawing Sheets

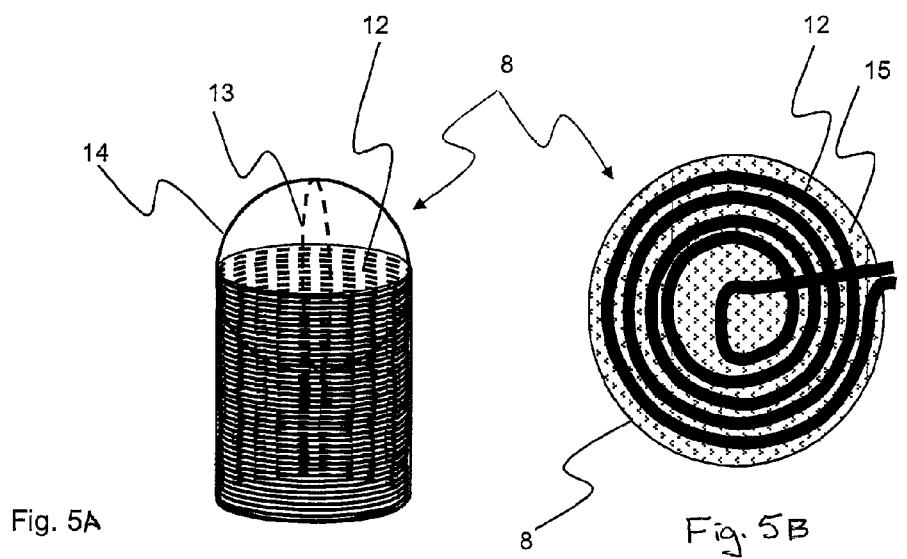
Fig. 5A
Fig. 5B
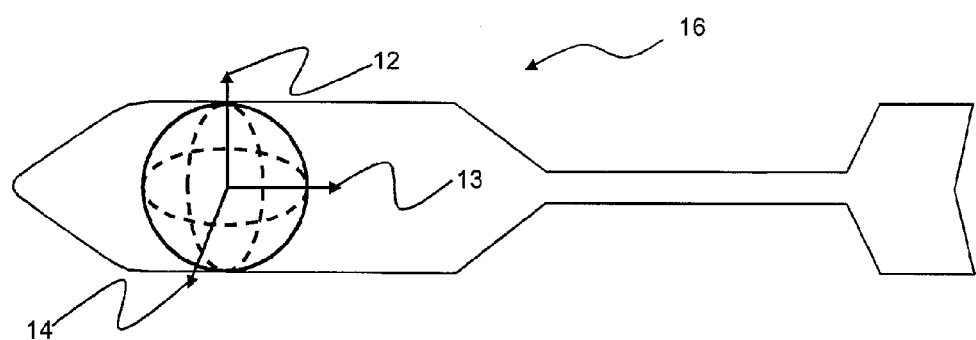
Fig. 6.

AIRBORNE GEOPHYSICAL SURVEY SYSTEM

This invention relates in general to the field of airborne geological mapping and more specifically relates to a method and apparatus for conducting geophysical surveys, which transmit and receive electromagnetic (EM) fields for the detection of conductive material in the earth and claims the benefit under 35 U.S.C. 119(e) of U.S. provisional application Ser. No. 62/075,674, filed Nov. 5, 2014.

FIELD OF THE INVENTION

Background

Electromagnetic (EM) geophysical techniques induce electrical currents in the earth using electromagnetic induction. A time varying magnetic field is created using a coil or loop of wire on or above the earth's surface. Faraday's law of induction tells us that a changing magnetic field will produce an electric field, which in turn will create an electric current. Thus, the primary magnetic field from the transmitter loop will create a secondary electric current in the earth. Finally, we measure the secondary magnetic field produced by those secondary electric currents in the earth.

FIG. 7 shows the waveform of the primary magnetic field generated by the transmitter and of the primary electric field (electromotive force) accompanying that magnetic field. The primary field impulse (transient) creates eddy currents immediately below the transmitter loop, approximating a mirror image. As the initial near-surface eddy currents decay, they in turn induce eddy currents at greater depths. The third panel in FIG. 7 shows the waveform of the secondary magnetic field, generated by the series of eddy currents induced in the ground. The magnitude and rate of decay of those secondary currents depend on the conductivity of the medium, (i.e. the electrical conductivity of the soil or conductors within the bedrock) and on the geometry of the conductive layers.

The TDEM receiver measures the magnetic fields created by those secondary currents. In time-domain electromagnetic techniques the inducing signal is a sharp pulse, or transient signal. The induced currents in the earth are initially concentrated immediately below the transmitter loop. With time, those currents will diffuse down and away from the transmitter. An analogy with smoke rings is often used to describe the behavior of the currents in the ground. Initially strong currents form in the ground adjacent to the transmitting loop. The "smoke ring" then expands, weakens, and travels down through the earth. The rate of diffusion depends on the earth conductivity. In resistive media the currents will diffuse very rapidly. In conductive media the currents will diffuse more slowly. A conductive layer at depth may "trap" currents in that layer, while currents elsewhere decay more rapidly.

Measurements of the secondary field are typically made in the time range from 10 microseconds to 10 milliseconds following the "shut-off" of the primary field. Measurements are made in 20 to 35 discrete "time gates", or time intervals, following the primary inducing pulse. For deeper exploration (thousands of feet) in conductive sections, measurement times can extend up to one second. Because measurements are made while the transmitter current is turned off, more sensitive measurements of the secondary field can be made.

Airborne EM surveying began in the 1950's using both fixed wing aircraft and helicopters as the platforms for carrying the equipment. The methods included Frequency Domain ElectroMagnetics (FDEM), and more recently Time Domain ElectroMagnetics (TDEM), both of which are active source methods, meaning the induced EM field is transmitted from the aircraft. An example of a TDEM surveying system and method is described in U.S. Pat. No. 7,157,914.

Another EM method is the natural or passive source EM field method. Passive source systems take advantage of weak EM fields generated from lightning from distant electrical storms. This method is generally referred to the Audio Frequency Magnetotelluric method or AFMAG or simply MagnetoTelluric (MT) method. An example of a passive source or natural source EM surveying system is described in U.S. Pat. No. 6,876,202.

Both FDEM and TDEM systems include, a transmitter coil, which induces a primary EM field into the earth resulting in a secondary EM field being created in any sub-surface electrically conductive bodies; second, a receiver system which collects data from a set of three orthogonal sensor coils which detect the secondary EM field.

The transmitter coil(s) are typically strung from wingtip to nose to wingtip to tail of a fixed-wing aircraft or suspended beneath a helicopter. The transmitter coil(s) typically includes one or more turns of electrical cable through which an electric current is transmitted. In the case of a FDEM system the transmitter is continuously transmitting which is referred to as 100% duty cycle. In the case of a TDEM system the transmitter is transmitting on and off or "pulsing" at, for example, 50% duty cycle. The transmitted field is referred to as the Primary EM field.

An important feature of an airborne EM system is the field strength of the induced primary field. The strength of the primary field is the product of the number of turns (N) of wire in the coil, the amperage of the transmitter (I) and the area of the coils (A). This is called the dipole moment or NIA. Hence, the larger the dipole moment the greater signal being transmitted.

A receiver system normally uses an induction type sensor to measure the secondary EM field which is the resulting field created in a conductive body in the earth. A receiving sensor typically includes multi-turn coils of electrical wire. The sensor may be a single, double or triple axis configuration. In the case of multi-axis sensors, the coils are oriented orthogonally. This allows the sensor to be sensitive to variations in magnetic field components having different directions. The sensitivity is largely dependent on the area of the coil meaning that scaling up to a large diameter coil would result in higher resolution data.

Interference to the electrical signal (EM field) being received is referred to as "noise". The response to movement and vibration of receiver sensors in all EM systems is a significant source of noise. This is much more significant with a moving airborne system than a stationary ground system. Airborne systems are sensitive to turbulence from wind and to vibration caused by the aircraft engines.

Flexing of the sensor coils also contributes to noise. Changes in the total magnetic flux passing through a receiver coil cause an electrical voltage to appear across the terminals of a coil.

By utilizing lighter-than-air-craft (LTAC) and suspending the receiver coils beneath the aircraft, vibration is reduced. An example of a TDEM surveying system and method is described in U.S. Patent Application No. US 2009/0284258 A1.

The desired system would have the greatest dipole moment or strongest signal and the least amount of noise resulting in the highest signal-to-noise ratio.

SUMMARY OF THE INVENTION

An objective of the present invention is to provide a multi-rotor drone as the support platform for an airborne EM system. A series of substantially horizontal, inner and outer polygonal, aluminum tubes comprise part of the structural frame of the drone. These tubes serve as the multi-turn, set of EM transmitting coils giving the overall transmitting coil assembly a very large geometric area. The invention may further provide a set of three, orthogonal, receiver sensor coils suspended with shock-absorbing cables beneath the aircraft. The receiver sensor coils shall be heavy gauge copper windings surrounded and electrically isolated by a high-density, essentially non-conductive sphalerite and will be housed in an aerodynamic containment shell. To prevent vibration from wind, engines and propellers the inertia of the heavy sensor will resist rapid movements thereby reducing noise. For more stable flight control the heavy sensor will be suspended centrally beneath the drone and supported by a minimum of eight cables attached, equidistantly from the outer, lower edge of the drone frame, thereby creating a pendulum effect.

Optionally, to provide additional stability a lighter-than-air balloon may be attached above the drone by means of cables which are equidistantly attached to the outer, upper side of the drone frame.

The goal of the present invention is develop an apparatus for conducting airborne electromagnetic surveys with a higher primary field strength and at lower transmitting frequencies than existing systems to gather higher resolution data with significantly less electronic noise. This may be accomplished by using a larger transmitting coil area and by minimizing vibration of the receiver sensor coils by 1) employing a multi-rotor drone, 2) relying on the inertia of a high density material; 3) using elastic support cables and/or 4) including a B field, magnetometer sensor.

According to one aspect of the invention there is provided an airborne geophysical survey system comprising:
an aircraft comprising:
  a frame;
  a plurality of lifting assemblies supported at spaced apart positions across the frame, the lifting assemblies each comprising a rotor arranged to provide lift when rotated and a motor arranged to drive rotation of the respective rotor;
  a flight controller arranged to control the lifting assemblies independent of one another so as to provide unmanned flight to the aircraft;
a transmitting source supported on the frame of the aircraft so as to be arranged to generate a primary electromagnetic field; and
a receiver system supported on the frame of the aircraft and including a receiver sensor arranged to sense a ground response to the primary magnetic field generated by the transmitting source in a geophysical survey.

Preferably the frame includes at least one annular element of conductive material which provides structural support to the frame and which is connected to the transmitting source such that said at least one annular element also functions as a transmitting coil.

Preferably said at least one annular element comprises a plurality of annular elements connected conductively in series with one another to commonly define the transmitting coil.

Preferably at least some of the annular elements are vertically spaced apart from one another and at least some of the annular elements are different in diameter relative to one another so as to be radially spaced apart from one another.

Preferably at least one of the annular elements defines an outermost circumference of the frame.

Preferably the frame includes a plurality of auxiliary frame members which are connected between the plurality of annular elements to form a truss structure with the annular elements so as to support the plurality of annular elements relative to one another in which the auxiliary frame members are electrically isolated from the annular elements.

In one embodiment, said at least one annular element comprises a plurality of segments arranged to be selectively coupled to one another in series in a circumferential direction such that the segments can be readily disassembled and reassembled. In this instance, each segment may extend generally linearly between opposing ends such that said at least one annular element is generally polygonal in shape.

Preferably the receiver sensor is suspended from the frame of the aircraft so as to be spaced therebelow, concentric with said at least one annular element.

Preferably the receiver sensor is suspended from the frame of the aircraft by a plurality of suspension cables extending generally radially outwardly from the receiver sensor to respective mounting locations on the frame which are spaced apart in a circumferential direction of said at least one annular element.

Preferably the suspension cables are mounted to the frame of the aircraft about an outermost circumference of the frame of the aircraft.

The system may further include a gas envelope containing a lighter-than-air gas therein which is connected to the frame of the aircraft so as to be located spaced above the frame. In this instance, a ballast member may also be supported on the frame of the aircraft so as to be suspended at a location spaced therebelow.

When the motor associated with each lifting assembly is an electric motor driven by a battery, the batteries may be suspended at a location spaced below the frame of the aircraft so as to function as a ballast.

When the motor associated with each lifting assembly is an internal combustion motor operatively connected to a fuel supply, the fuel supply may be suspended at a location spaced below the frame of the aircraft so as to function as a ballast.

The receiver system preferably comprises at least one receiver coil arranged to sense said ground response in which said at least one receiver coil comprising a plurality of windings of conductive wire supported about a common receiver axis of the receiver coil in which each winding is separated from other ones of the windings by a separation distance which is greater than a diameter of the conductive wire.

The receiver system preferably further comprises a magnetometer arranged to sense a magnitude of a magnetic field in the ground responsive to the primary magnetic field. The magnetometer is preferably suspended from the frame of the aircraft at a location spaced below said at least one receiver coil.

According to a further aspect of the present invention there is provided a receiver system for use in an airborne geophysical survey system comprising an aircraft and a transmitting source supported on the aircraft so as to be arranged to generate a primary electromagnetic field; the receiver system comprising:

at least one receiver coil arranged to be supported on the aircraft so as to be arranged to sense a ground response to the primary magnetic field generated by the transmitting source in a geophysical survey;

said at least one receiver coil comprising a plurality of windings of conductive wire supported about a common receiver axis of the receiver coil in which each winding is separated from other ones of the windings by a separation distance which is greater than a diameter of the conductive wire.

The receiver system may further comprise a solid, non-conductive material, for example sphalerite, spanning between the plurality of windings of said at least one receiver coil. The solid, non-conductive material preferably has a specific gravity of greater than 2. The conducive wire of said at least one receiver coil preferably comprises copper.

Some embodiments of the invention will now be described in conjunction with the accompanying drawings in which:

BRIEF DESCRIPTION OF THE DRAWINGS

FIG. 5A is a perspective view of three orthogonal axes of the copper windings of the receiving sensor coils.

FIG. 5B shows a plan view of the Z axis copper windings surrounded by electrically, non-conductive material such as sphalerite.

FIG. 6 is a side elevation view of the magnetometer sensor contained within an aerodynamic bird and a cut-away view illustrating the X, Y and Z axes which are oriented orthogonally.

In the drawings like characters of reference indicate corresponding parts in the different figures.

DETAILED DESCRIPTION

Figure 1:
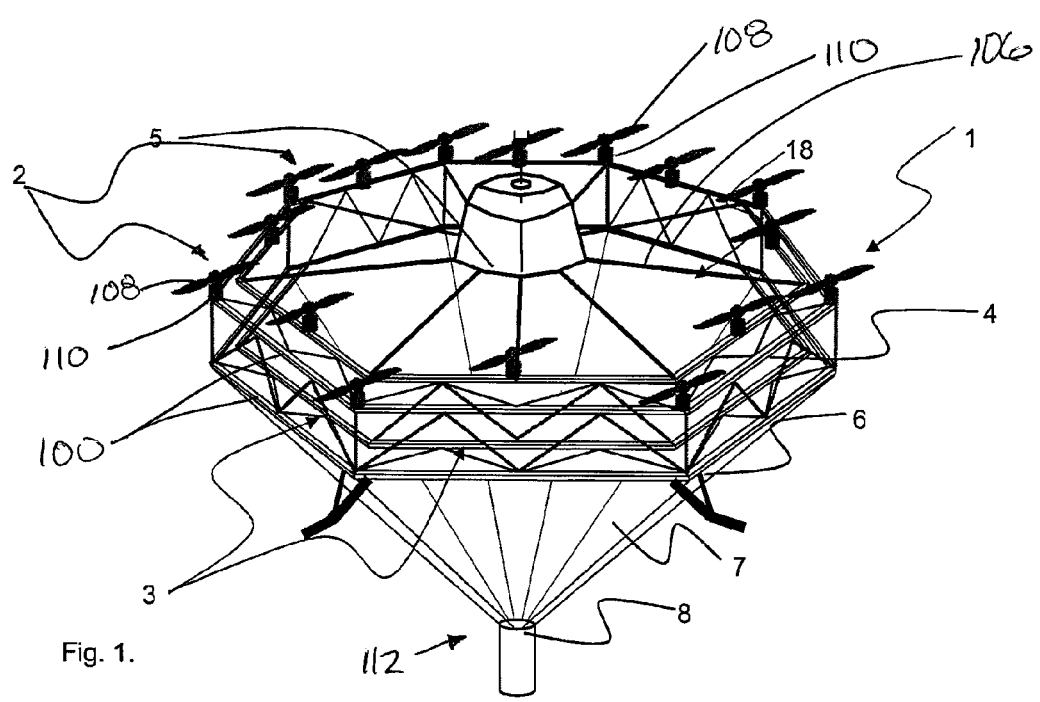
FIG. 1 is a perspective view of the apparatus of the present invention in the airborne, operational mode. In this embodiment the high density receiver sensor is suspended centrally beneath the drone by means of cables attached, equidistantly from the outer, lower edge of the drone frame, thereby creating a pendulum effect for stability.

The present invention comprises an airborne (frequency or time domain) EM survey system 1. The survey system 1 includes a multi-rotor, drone 18, a series of transmitting coils 3, transmitter and receiver assembly in an onboard console 5, an EM receiver sensor 8 and a magnetometer sensor 16.

FIG. 1 is a perspective view of the apparatus of the present invention in the airborne, operational mode. In this embodiment the high density receiver sensor 8 is suspended centrally beneath the drone 18 by means of cables 7 attached, equidistantly from the outer, lower edge of the drone frame 3, thereby creating a pendulum effect for stability of the aircraft during flight.

The survey system 1 is propelled and maneuvered by increasing or decreasing the speed of the rotors 2 independently. This maneuvering is accomplished by means of flight software algorithms. The drone 18 is an unmanned air vehicle (UAV) with flight path being managed on the ground from a remote control unit 17.

Electronic transmitting and receiving equipment for inducing an electrical current and for data collection and navigation is housed in a console 5, which is semi-rigidly attached to the drone 18.

Figure 2:
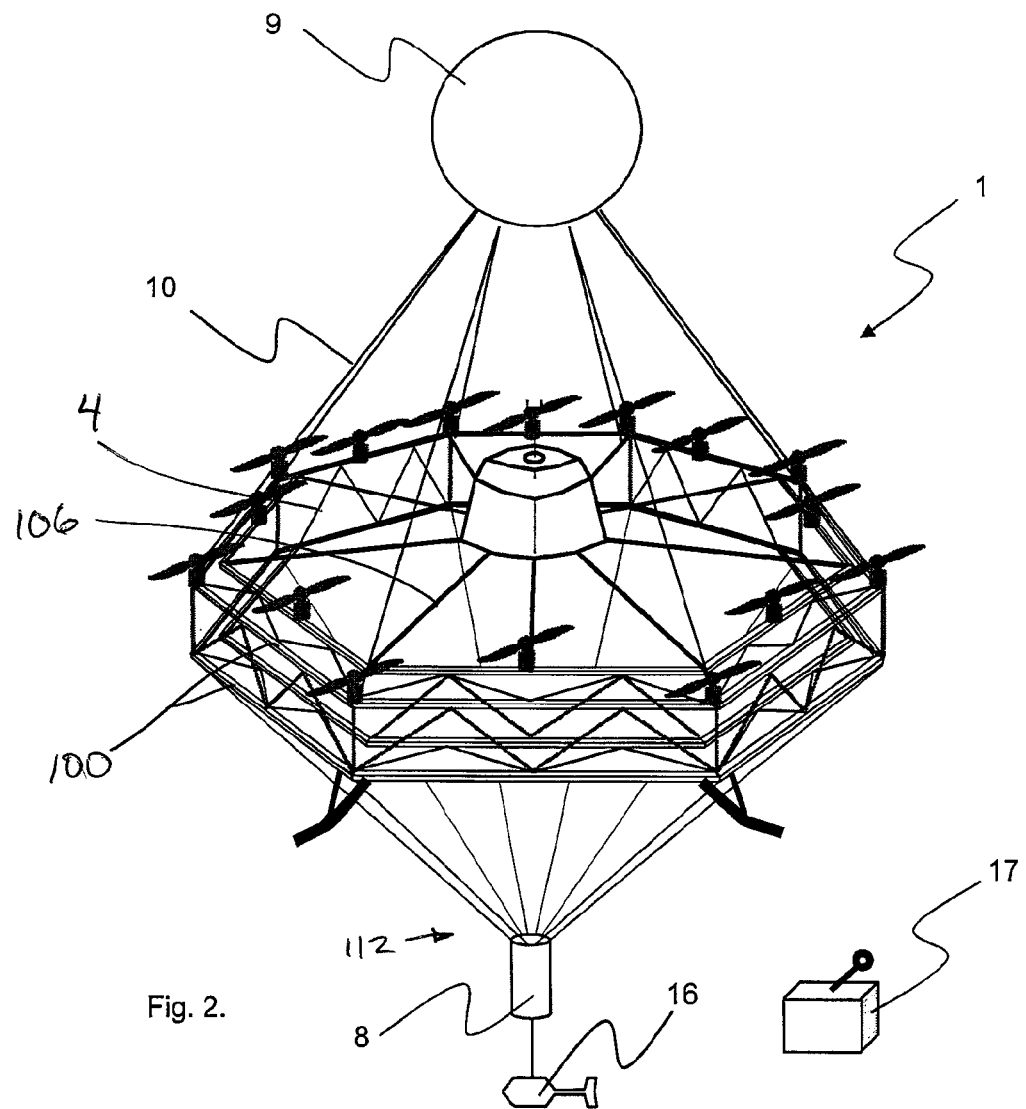
FIG. 2 is a perspective view of the apparatus of the present invention in the airborne, operational mode. In this embodiment a lighter-than-air (LTA) envelope is used to create additional vertical lift opposing the gravitational force exerted on the high density receiver sensor which is suspended centrally beneath the drone. A magnetometer sensor is shown beneath the induction sensor.

In another embodiment in FIG. 2 the drone 18 has a lighter-than-air (LTA) envelope 9, secured above the drone 18 to provide additional vertical lift against the force of gravity acting on the high density sensor 8. The LTA envelope 9 is secured by means of cables 10 attached, equidistantly from the outer, upper edge of the drone 18, thereby increasing the pendulum effect for stability of the aircraft during flight.

Figure 4:
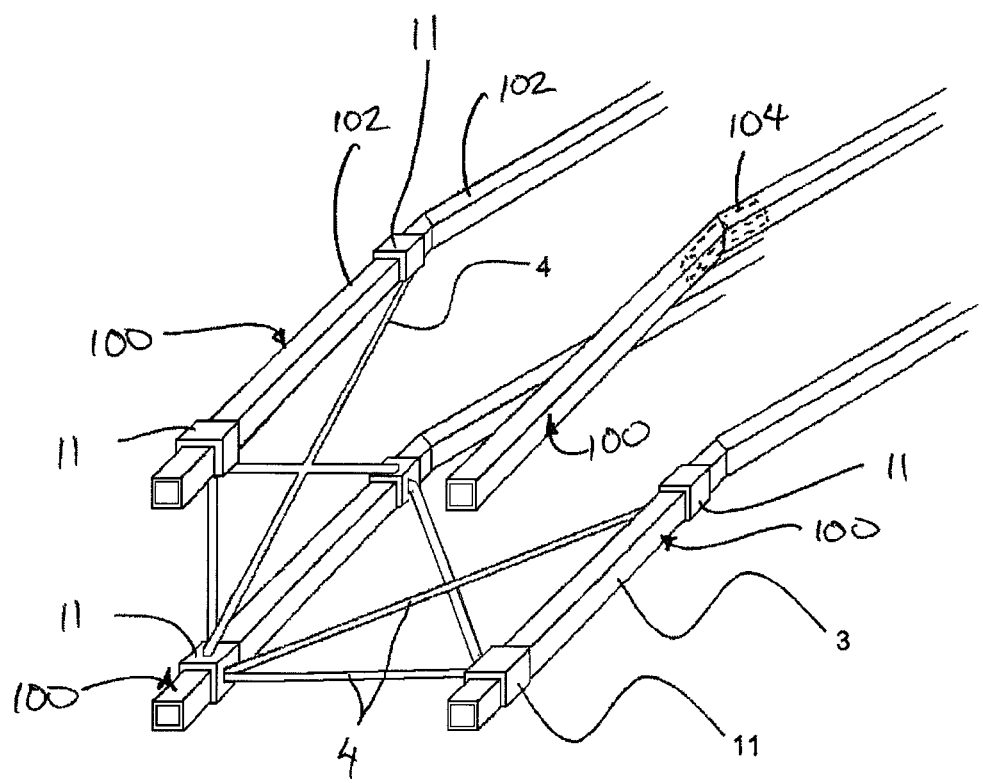
FIG. 4 is a perspective view of electrically isolated structural, aluminum framework members which are used to carry the transmitted current.

FIG. 4 is a perspective view of the structural frame of the drone 18. The frame is comprised of a series of horizontal polygons of aluminum, transmitting tubes 3, which carry an electrical current which induces a primary EM field into the earth. The transmitting tubes 3 will be electrically isolated by means of insulators 11 from the structural supports 4.

FIGS. 5A and 5B illustrate the design of the EM receiver sensor 8 which houses three orthogonal induction coils X 13, Y 14 and Z 12 in a perspective view in the drawing on the left. The drawing on the right is a plan view of sensor 8, which illustrates the multiple copper windings of the Z component 12, which are separated and electrically isolated by essentially non-conductive sphalerite 15. The windings 12 are separated a prescribed distance in order to prevent self-inductance and capacitance. A high number of windings are used to increase the net effective coil and therefore increase the sensitivity of the sensor 8 and also to increase the inertia of the sensor 8 to minimize vibration and reduce noise.

The rotors 2 may be powered by electric motors or by internal combustions engines. The batteries or liquid fuel may be suspended beneath the drone 18 to provide additional stability of the craft and or to increase the inertia in the sensor 8.

FIG. 6 illustrates the design of the magnetomer sensor 16 which also measures the EM field in the same three X, Y and Z orientations as the orthogonal induction coils X 13, Y 14 and Z 12 and which also includes the high density ballast material 15, which has a specific gravity of greater than 3.8

Figure 7:
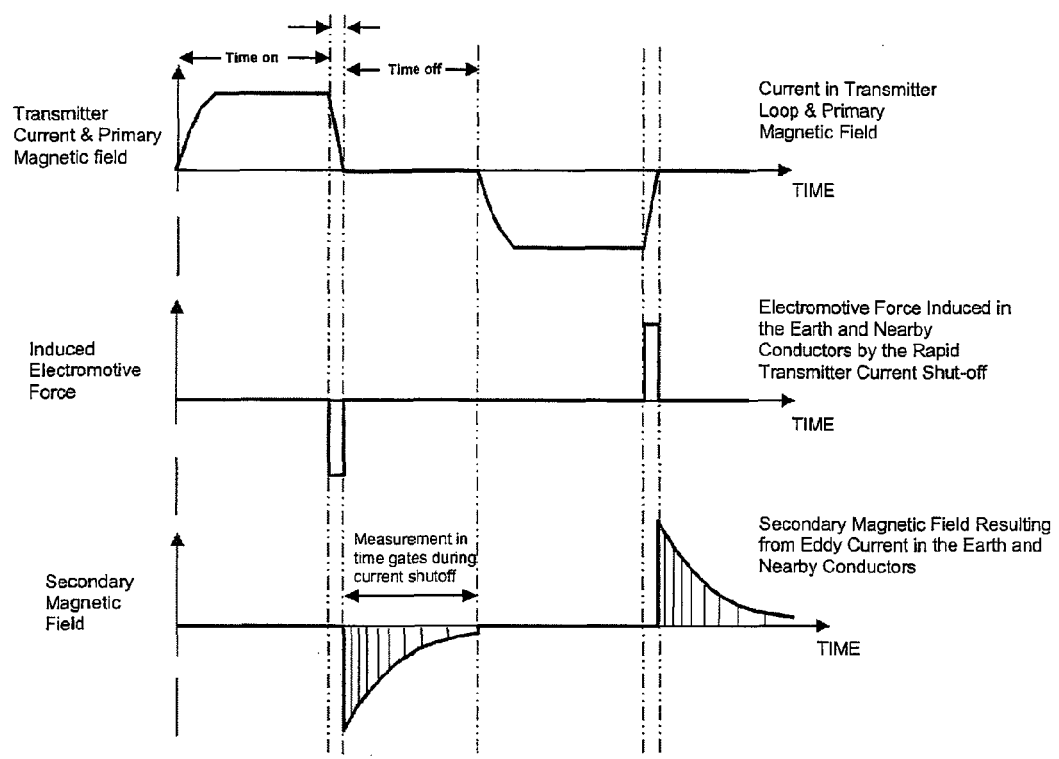
FIG. 7 illustrates an example of Time Domain Electromagnetic (TDEM) wave forms.

FIG. 7 illustrates an example of Time Domain Electromagnetic (TDEM) wave forms.

Figure 8:
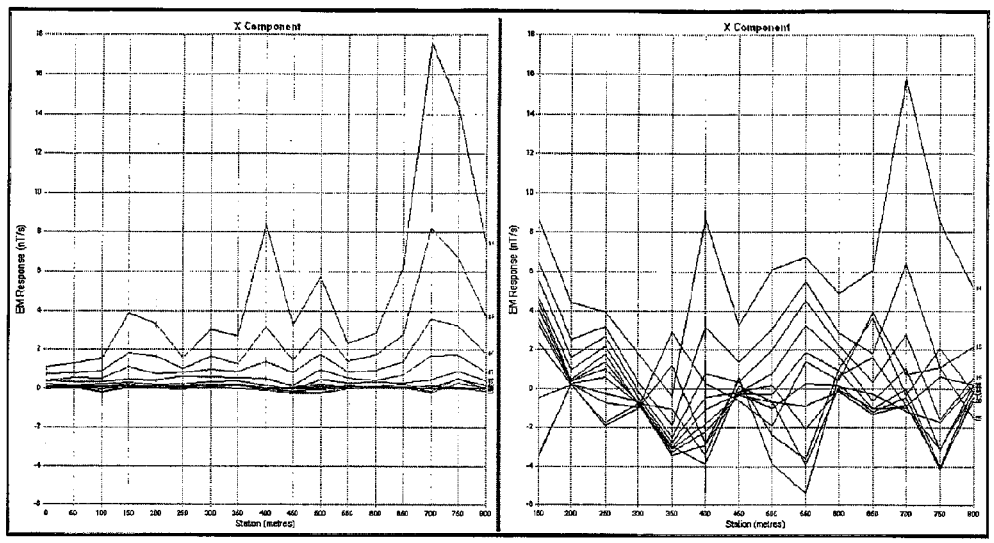
FIG. 8 illustrates two examples of TDEM data. The left pane illustrates EM data gathered when the sensor was attached to a high density frame to provide inertia to stabilize the sensor against vibration in high winds. The right pane illustrates EM data gathered when the sensor is not stabilized in the same high winds.

The two examples of TDEM data illustrated in FIG. 8 are from actual geophysical data gathered in the field. The left pane illustrates EM data that was gathered when the sensor was attached to a high density frame to provide inertia to stabilize it against vibration in high winds. The right pane illustrates EM data that was gathered when the sensor was not stabilized in the same high winds. It is anticipated that the data gathered by the EM receiver sensor 8 in the present invention will have a substantially lower noise level than that of existing systems, which do not employ an inertial mass in the form of a high density ballast material 15.

As described herein, the present invention relates to an airborne geophysical survey system 1 which includes an aircraft 18 having a frame, lifting assemblies 2 supported at spaced apart positions across the frame to provide lift to the frame, and a flight controller 5 which controls the lifting assemblies independently of one another so as to provide unmanned flight to the vehicle by receiving control signals from a remote control 17 to modify the speed and orientation of the lifting assemblies to direct the elevation, direction of movement, and speed of the overall aircraft 18 relative to the ground. The survey system 1 further includes a transmitting source provided by the coils 3 supported on the frame for generating a primary electromagnetic field and a receiver system supported on the frame which includes the EM sensor 8 and the magnetometer sensor 16 for sensing the ground response to the primary magnetic field generated by the transmitting source during a geophysical survey.

In each embodiment, the frame of the aircraft 18 generally includes a plurality of annular frame elements 100 formed of conductive material and which are supported concentrically about a central vertical axis of the aircraft. The annular elements are supported at different elevations and include both outer elements having a first diameter defining the overall outer diameter of the aircraft, as well as inner elements having a second diameter which is reduced relative to the first diameter. The inner and outer elements are supported in pairs such that the inner and outer elements within each pair are mounted within a common plane at a different elevation along the central vertical axis from other pairs of elements. In this instance some of the annular frame elements are spaced apart vertically from one another and other ones are spaced apart radially relative to one another. As shown in FIG. 4, in the preferred embodiment there are four annular frame elements 100 supported in a square relationship relative to one another in a radially oriented cross-sectional plane.

Each annular frame element 100 includes a rigid tube of conductive material extending continuously in the circumferential direction. Each frame element extends substantially about one full circumference of the aircraft frame, with the conductive material of the annular elements being connected conductively in series with one another so that the plurality of annular frame elements collectively define a single transmitter loop, which may have a generally helical form for example, for generating the primary magnetic field when coupled to a suitable power source. Each annular frame element 100 is comprised of a plurality of linear sections 102 which span respective portions of the overall circumference such that the linear sections 102 are connected in series with one another to define an overall polygonal shape to the frame. Connectors 104 may be connected between the abutted ends of each adjacent pair of linear sections 102 using suitable fasteners which permit the sections to be readily disassembled from one another and reassembled at a subsequent location as may be desired.

In addition to the annular frame elements 100, the frame of the aircraft 18 further includes a plurality of auxiliary structural supports 4 which are connected between the inner and outer frame elements of each pair of elements within a common plane therewith, as well as being connected between each frame element 100 and the one or more frame elements directly thereabove or therebelow. The structural supports 4 function as struts and cords of a truss structure interconnected between two frame elements which define the two beams of the resulting truss structure. Each structural support 4 is joined at opposing ends to respective ones of the annular frame elements 100 by electrically insulated connectors 11. In this manner the structural supports 4 may be formed a rigid conductive material. Alternatively the structural supports 4 may instead be formed of electrically insulating or nonconductive material.

The frame of the aircraft 18 further includes a plurality of radial spokes 106 extending radially outward from the flight controller 5 supported centrally on the aircraft at the common upright axis about which the annular frame elements are concentrically mounted. Each radial spoke 106 is fixed at an inner end to a central hub of the frame supporting the flight controller 5 thereon and is fixed at a corresponding outer end to one of the annular frame elements 100. Similarly to the structural supports 4, each radial spoke 106 is either formed of a nonconductive material, or is connected to the annular frame elements by electrically isolated connectors which electrically isolate the radial spokes from the annular frame elements forming the transmitter coil 3.

As described above, the majority of the frame of the aircraft 18 is defined by the annular frame elements 100 which provide the dual function of providing structural support to the frame as well as providing the function of a transmitting coil which generates a primary electromagnetic field in an airborne geophysical survey.

The lifting assemblies 2 each comprise a rotor 108 supporting propeller blades thereon which rotates about an upright rotor axis oriented generally parallel to the common central axis of the aircraft frame, and a motor 110 dedicated to driving the respective rotor 108 associated therewith. The flight controller 5 is operatively connected to each of the motors of the plural lifting assemblies 2 for controlling the speed of rotation, the axis of rotation, and the pitch of the propeller blades of each lifting assembly independently of the other lifting assemblies. By varying the different performance characteristics of the different lifting assemblies, the flight controller is able to direct the orientation, speed and direction of the aircraft frame relative to the ground. The lifting assemblies 2 are mounted at generally even spaced positions in the circumferential direction about the annular frame elements 100. Some lifting assemblies may be mounted to the outer frame elements at the outer circumference of the aircraft frame, while other lifting assemblies may be mounted at respective positions spaced radially inward from the outer circumference of the aircraft frame to provide balanced lifting to the aircraft.

Each lifting assembly 2 is supported on the annular frame elements 100 of the aircraft 18, again using nonconductive or electrically isolating connectors so as not to interfere with the function of the annular frame elements as a transmitter coil for generating a primary electromagnetic field.

The individual motors may each comprise an internal combustion engine, or alternatively an electric motor. In the instance of electric motors, the batteries providing electrical power to the motors are preferably centrally mounted at a location spaced below the aircraft frame at a ballast location 112 best shown in FIG. 3. Alternatively in the instance of internal combustion engines, fuel for providing power to the motors is preferably centrally mounted at the ballast location 112 in place of batteries. The ballast location 112 is typically supported along the central axis of the aircraft frame at a location spaced below the annular frame elements for use of a plurality of suspension cables 7. The suspension cables are preferably anchored at respective top ends thereof at circumferentially spaced apart positions about one or more of the annular frame elements 100 so as to extend downwardly and radially inwardly towards the central ballast location where the bottom ends of the cables are coupled to one another.

The suspension cables 7 are also used to suspend components of the receiver system at a central location spaced below the annular frame elements 100.

In some embodiments, the aircraft 18 further includes a gas envelope 9 suitable for containing a lighter than air gas therein. The gas envelope is supported above the frame of the aircraft assembly and is connected to the frame by cables 10 which effectively suspend the frame of the aircraft from the gas envelope 9 to provide some lift and carry some of the weight of the aircraft frame during flight. The gas envelope 9 contains sufficient lighter than air gas therein to provide a lifting force to the aircraft which may carry substantially all of the weight of the aircraft frame and sensor supported thereon such that the lifting assemblies 2 are provided only for manoeuvring the aircraft, or alternatively the gas envelope 9 may only provide a lifting force corresponding to a portion of the aircraft frame such that the lifting assemblies are still relied on to provide a minor or major portion of the lift required for flight.

In the illustrated embodiment, the gas envelope 9 is spherical in shape and is concentrically located along the central axis of the aircraft frame at a location spaced vertically above the annular frame elements 100 of the frame. The suspension cables 10 are connected at respective bottom ends at spaced apart positions in the circumferential direction about the outer circumference of the frame of the aircraft 18, so as to extend upwardly and radially inwardly towards respective top ends which are connected to the envelope 9. Accordingly the cables 10 collectively form a conical shape extending between the annular frame elements 100 and the gas envelope 9 supported thereabove, similarly to the conical shape formed by the suspension cables 7 supporting the ballast and the receiver system 8 below the annular frame elements 100. All of the cables 10 and 7 are connected to the annular frame elements 100 again using nonconductive connectors which electrically isolate the cables from the annular frame element so as not to interfere with the function of the annular frame elements as a transmitting coil.

Figure 3:
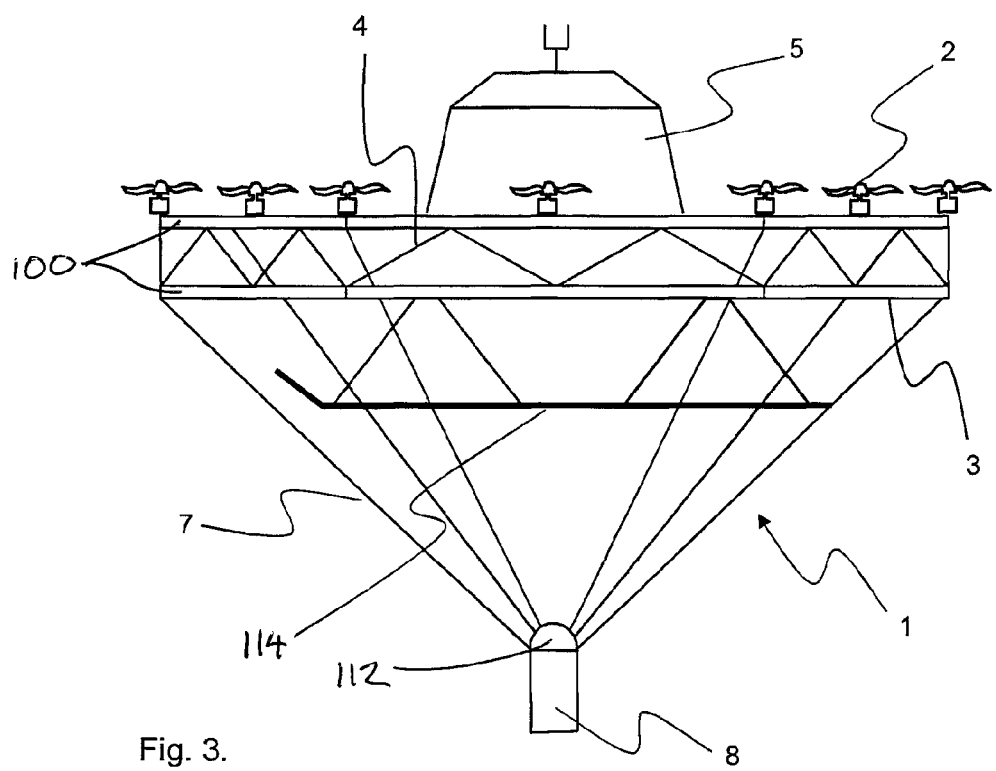
FIG. 3 is a side elevation view of the apparatus of the present invention.

The aircraft 18 may further include a pair of landing skids 114 as shown in FIG. 3 including legs extending downward from the frame of the aircraft and feet at the bottom end of the legs to engage the ground and support the annular frame elements defining the majority of the frame of the aircraft at a location spaced above the ground. The receiver sensor 8 is typically supported during flight at a location spaced well below the landing skids 114; however, the flexible nature of the suspension cables allows the sensor and ballast to be laid on the ground followed by subsequent engagement of the landing skids with the ground as the aircraft frame approaches the ground for landing.

Turning now more particularly to the receiver 8 as shown in FIGS. 5A and 5B, the primary coil 12 in this instance comprises a plurality of windings about a common vertical axis in which the windings vary in elevation along the vertical axis and vary in radius relative to one another to occupy an overall generally cylindrical space. Each individual winding is spaced apart from other windings by a distance which is at least equal to or greater than the thickness of the conductive wire forming each winding. The space between each winding and adjacent windings is occupied by the nonconductive, sphalerite material 15. The secondary winding 13 and the tertiary winding 14 form respective loops extending about respective horizontal axes which are perpendicular to one another and perpendicular to the common vertical axis of the primary coil 12. Noise is reduced by stabilizing the coils against rotational movement, flexing and vibration.

Since various modifications can be made in my invention as herein above described, it is intended that all matter contained in the accompanying specification shall be interpreted as illustrative only and not in a limiting sense.

The invention claimed is:

1. An airborne geophysical survey system comprising:
   an aircraft comprising:
      a frame including at least one annular element of conductive material which provides structural support to the frame;
      a plurality of lifting assemblies supported at spaced apart positions across the frame, the lifting assemblies each comprising a rotor arranged to provide lift when rotated and a motor arranged to drive rotation of the respective rotor;
      a flight controller arranged to control the lifting assemblies independent of one another so as to provide unmanned flight to the aircraft;
   a transmitting source comprising said at least one annular element of the frame connected to a power source such that said at least one annular element also functions as a transmitting coil arranged to generate a primary electromagnetic field; and
   a receiver system supported on the frame of the aircraft and including a receiver sensor arranged to sense a ground response to the primary magnetic field generated by the transmitting source in a geophysical survey.

2. The system according to claim 1 wherein the receiver sensor is supported on the frame of the aircraft so as to be concentric with said at least one annular element.

3. The system according to claim 1 wherein the motor associated with each lifting assembly is an electric motor driven by a battery in which the battery is suspended at a location spaced below the frame of the aircraft so as to function as a ballast.

4. The system according to claim 1 wherein the motor associated with each lifting assembly is an internal combustion motor operatively connected to a fuel supply, the fuel supply being suspended at a location spaced below the frame of the aircraft so as to function as a ballast.

5. The system according to claim 1 wherein said at least one annular element comprises a plurality of annular elements connected conductively in series with one another to commonly define the transmitting coil.

6. The system according to claim 5 wherein at least one of the annular elements defines an outermost circumference of the frame.

7. The system according to claim 5 wherein the frame includes a plurality of auxiliary frame members which are connected between the plurality of annular elements so as to form a truss structure and support the plurality of annular elements relative to one another, the auxiliary frame members being electrically isolated from the annular elements.

8. The system according to claim 1 wherein said at least one annular element comprises a plurality of segments arranged to be selectively coupled to one another in series in a circumferential direction such that the segments can be readily disassembled and reassembled.

9. The system according to claim 8 wherein each segment extends generally linearly between opposing ends such that said at least one annular element is generally polygonal in shape.

10. The system according to claim 1 further comprising a gas envelope containing a lighter-than-air gas therein which is connected to the frame of the aircraft so as to be located spaced above the frame.

11. The system according to claim 10 further comprising a ballast member supported on the frame of the aircraft so as to be suspended at a location spaced therebelow.

12. The system according to claim 1 wherein the receiver system comprises:
   at least one receiver coil arranged to sense said ground response;
   said at least one receiver coil comprising a plurality of windings of conductive wire supported about a common receiver axis of the receiver coil in which each winding is separated from other ones of the windings by a separation distance which is greater than a diameter of the conductive wire.

13. The system according to claim 12 wherein the receiver system further comprises a solid, non-conductive material spanning between the plurality of windings of said at least one receiver coil and wherein the solid, non-conductive material has a specific gravity of greater than 2.

14. The system according to claim 1 wherein the receiver system comprises:
   at least one receiver coil arranged to sense said ground response; and
   a magnetometer arranged to sense a magnitude of a magnetic field in the ground responsive to the primary magnetic field.

15. The system according to claim 14 wherein the magnetometer is suspended from the frame of the aircraft at a location spaced below said at least one receiver coil.

* * * * *